Nov. 29, 1949  D. W. NORWOOD  2,489,664
DEVICE FOR CALCULATING PHOTOGRAPHIC EXPOSURE
Filed Dec. 6, 1946  3 Sheets-Sheet 1
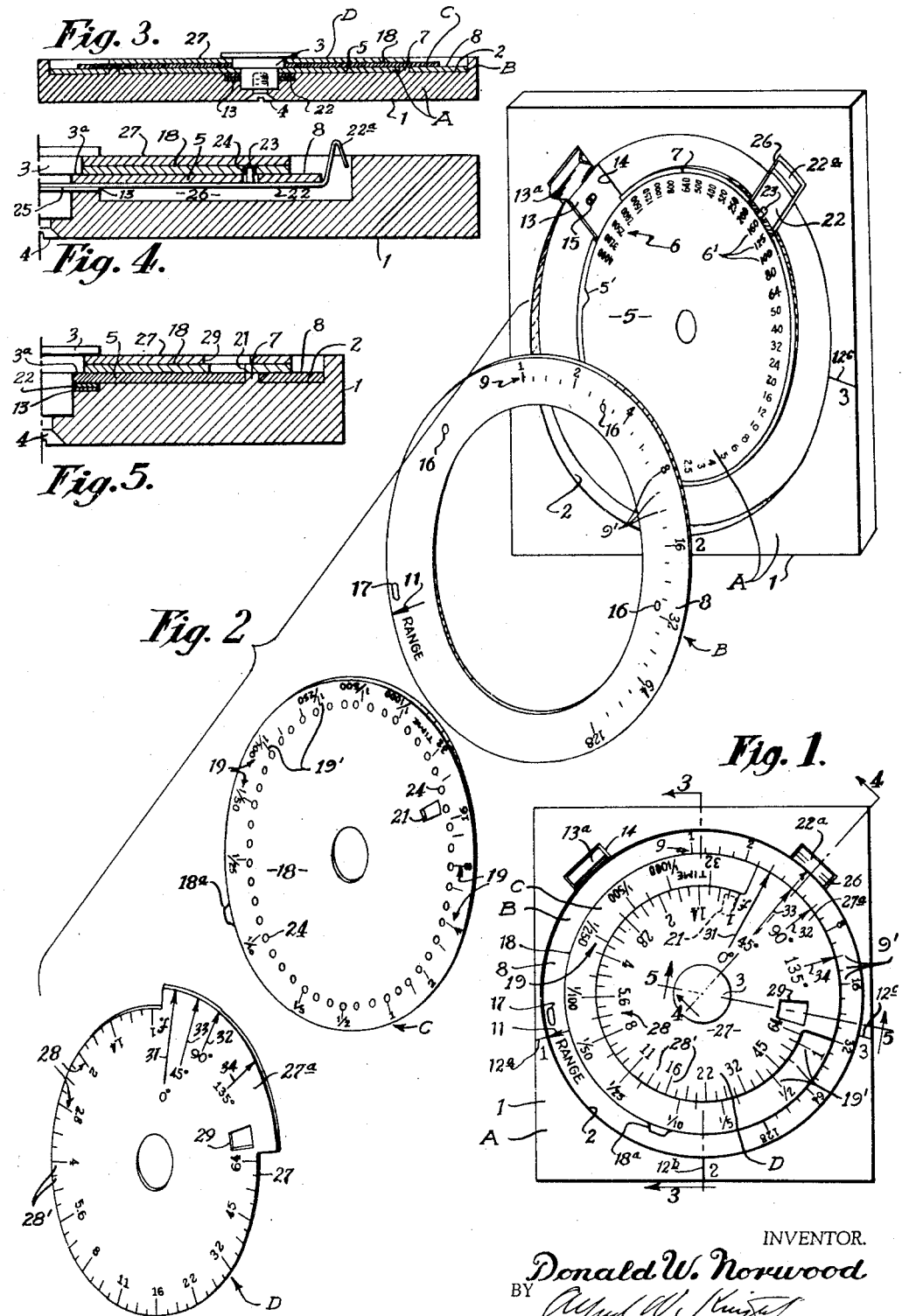
INVENTOR.
Donald W. Norwood
BY
ATTORNEY.

Nov. 29, 1949   D. W. NORWOOD   2,489,664
DEVICE FOR CALCULATING PHOTOGRAPHIC EXPOSURE
Filed Dec. 6, 1946   3 Sheets-Sheet 2
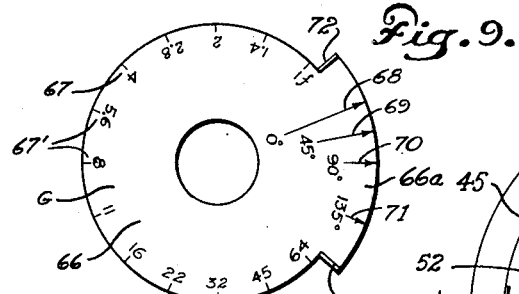
Fig. 9.
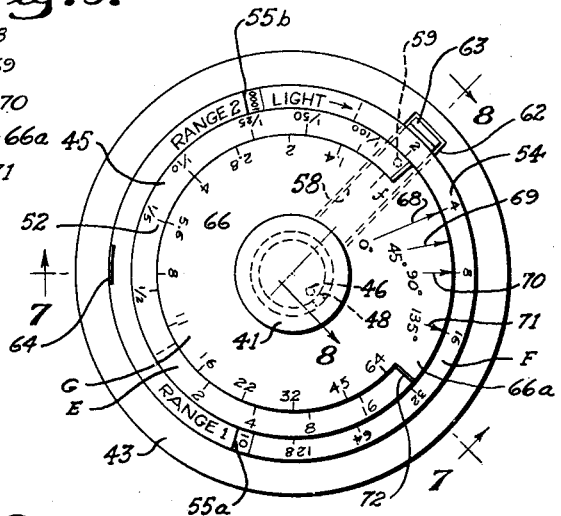
Fig. 6.
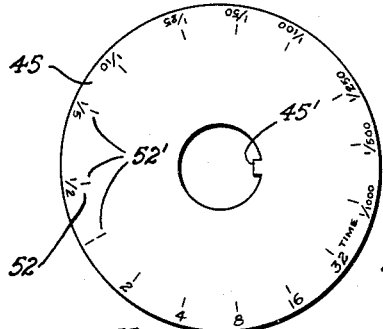
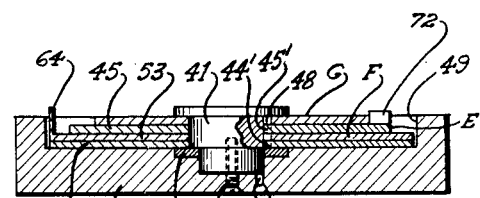
Fig. 7.
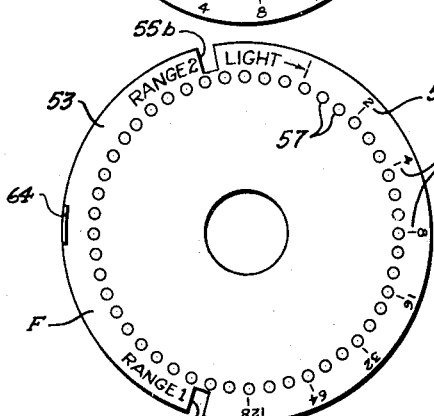
Fig. 11.
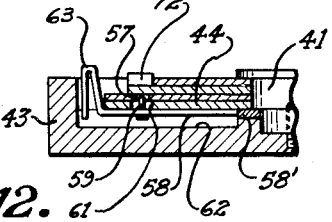
Fig. 8.
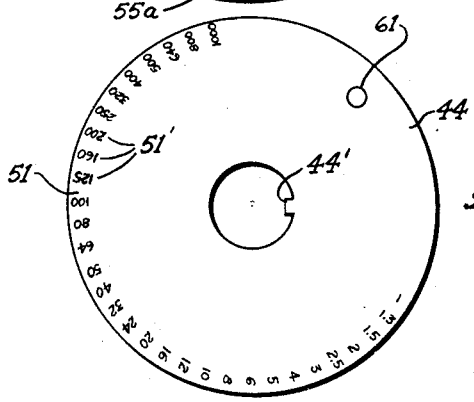
Fig. 12.
INVENTOR.
Donald W. Norwood
BY
ATTORNEY Nov. 29, 1949  D. W. NORWOOD  2,489,664
DEVICE FOR CALCULATING PHOTOGRAPHIC EXPOSURE
Filed Dec. 6, 1946  3 Sheets-Sheet 3
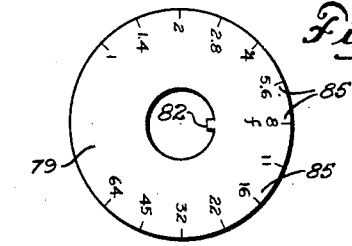
Fig. 16.
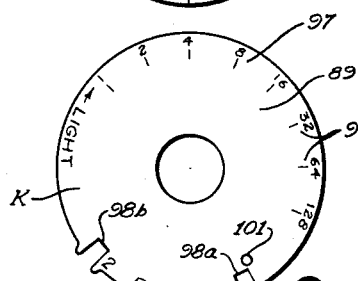
Fig. 17.
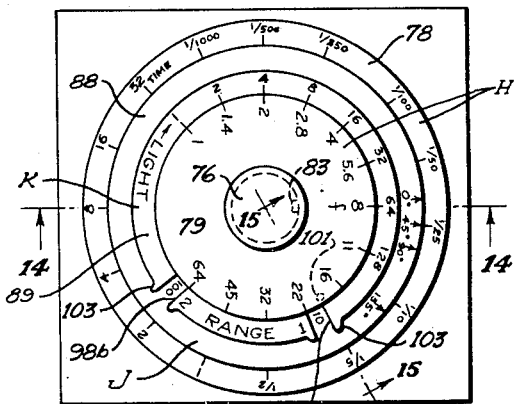
Fig. 13.
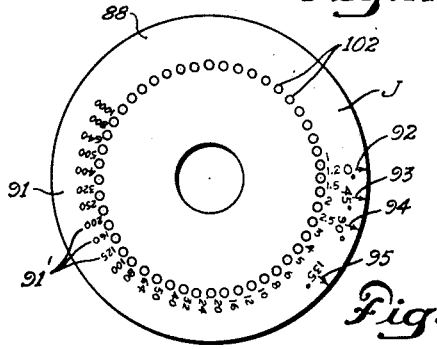
Fig. 18.
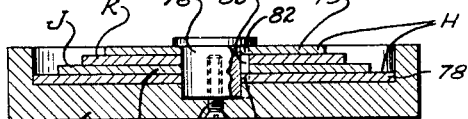
Fig. 14.
Fig. 15.
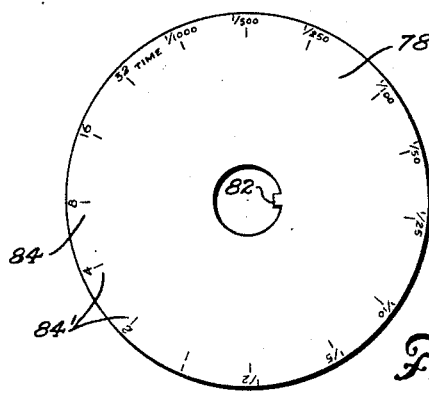
Fig. 19.
INVENTOR
Donald W. Norwood
BY
ATTORNEY Patented Nov. 29, 1949

2,489,664

UNITED STATES PATENT OFFICE 2,489,664

DEVICE FOR CALCULATING PHOTOGRAPHIC EXPOSURE

Donald W. Norwood, Pasadena, Calif.

Application December 6, 1946, Serial No. 714,394

11 Claims. (Cl. 235—64.7)

This application relates to the photographic art, and pertains particularly to a device which enables the rapid and exact calculation of the required photographic exposure under varied lighting conditions encountered in ordinary use. The device is intended to be used in conjunction with a light intensity measuring device adapted to measure the light intensity incident upon the photographic subject (rather than the intensity of the light reflected from the subject), the data obtained from the light-intensity measuring device being directly utilized in the ascertainment of the desired result, for example, the proper values of lens aperture and shutter speed for a given condition of film speed and lighting.

This application is a continuation-in-part of my abandoned application Ser. No. 578,640, filed February 19, 1945.

The proper appraisal of the photographic effectiveness of the illumination of a particular subject has always presented difficulties which result in the user of any photographic exposure-estimating device having to make a mental correction of the value indicated by such device in order to compensate for some condition which the device itself cannot be depended upon to compensate. For example, in the case of the reflected light meter, an assumption is made that the average scene reflects a certain percentage of the incident light; if the scene departs from this certain reflectance, the user must compensate for the departure by a mental compensation of the result indicated by the device. This mental compensation relies upon the judgment of the user, and is subject to considerable error. As a general rule, a fairly good result may be obtained where "black-and-white" film material is being employed, as a result of the latitude such film has for exposure, but where the so-called "natural-color" films are employed, a much closer determination of the optimum exposure must be attained in order that good color rendition is obtained.

I have observed that a very close determination of the proper photographic exposure may be had by measurement of the value of the main light falling upon the subject, i. e., the light constituting the "key" light for the subject, and utilizing that value with reference to the angle that the direction of such light makes with the camera axis to determine the "effective" illumination. This latter feature makes it possible to utilize the "key" light illumination as though it were the entire illumination, insofar as determination of the photographic exposure is concerned. This requires the use of a so-called "incident-light" type of exposure meter, and the proper application of the values obtained, in the ensuing computation of the photographic exposure.

The device of the present invention is adapted to provide proper computation of the correct exposure for a photographic subject when used with a "key" light measuring device of the incident-light type. One of the particular objects of the invention is to provide a device for the determination of photographic exposure which enables the user to consider the effective angle of the illumination provided by the "key" light.

A further object of the invention is to provide a device for the determination of photographic exposure, which is provided with the customary scales for the different factors to be considered, such as film sensitivity, light intensity, shutter time and lens aperture, together with indices for establishing the photographic exposure with reference to the angle of effective illumination provided by the "key" light which illuminates the photographic subject.

A further object is to provide a device of the character described, having a scale representing light intensity values arranged according to a geometric progression, said scale being movable between fixed positions establishing such scale so that the indicia thereon indicate light values in different orders of magnitude, and preferably including locking means for establishing such scale in any one of such plurality of fixed positions.

The device of the present invention comprises a plurality of scale members interconnected for relative rotation about a common axis and provided with a plurality of concentric scales indicative of different factors involved in determining photographic exposure, commonly referred to as "exposure factors." Each scale has a plurality of angularly spaced indicia representing different values of the corresponding exposure factor. In general, the concentric scales include a scale indicative of light intensity values such as are obtained by an incident light meter, a scale indicative of film sensitivity, and a scale indicative of lens aperture or "f-stop." If the exposure time is also a variable factor, as is generally the case in still photography, a scale indicative of exposure time or "shutter speed" is also provided.

In order to adapt the device for use over a wide range of light intensity conditions, the device preferably also includes a scale having angularly spaced indicia representing different ranges of light intensity. The indicia of the light intensity scale represent different values of light intensity according to a geometric progression, and the indicia of the light intensity "range" scale represent ranges of different orders of magnitude.

The several scale members are adapted to be set, by relative rotation, to indicate the proper value of one of the exposure factors corresponding to different values of the other factors. In preferred embodiments of the invention, the device gives an indication of properly related values of lens aperture and shutter speed corresponding to given values of light intensity and film sensitivity. In order to facilitate the setting and manipulation of the scale members, I preferably provide releasable latch means whereby one of the scale members may be latched to another member in any desired relation thereto, so that the two members thus latched together operate as a unit relative to the remaining scale member or members.

According to this invention, one of the scale members that is provided with a scale indicative of one of the above mentioned exposure factors is also provided with a plurality of angularly spaced indices representing different angular relationships between the camera axis and the direction of the main or "key" illumination falling upon a given photographic subject, such angular relationship being referred to hereinafter as the "key light angle." These key light angle indices are positioned to register with the indicia of a scale on one of the other scale members, and are so located angularly with respect to the indicia of the scale on the said one scale member as to modify the indications of one exposure factor (corresponding to given values of the other factors) in accordance with variations in the key light angle, when the corresponding key light angle index is set to register with any one of the indicia of the scale on said other scale member.

The above and other features of the invention will be brought out in or will be apparent from the ensuing description of preferred embodiments thereof, as illustrated in the accompanying drawings, in which:

Fig. 1 is a face view of one embodiment of the device, with the dials set for the solution of a given problem;

Fig. 2 is an exploded perspective view of the device shown in Fig. 1, showing the several scale members thereof;

Fig. 3 is a sectional view, as taken on line 3—3 in Fig. 1;

Fig. 4 is a fragmentary section as taken on line 4—4 in Fig. 1;

Fig. 5 is a fragmentary section as taken on line 5—5 in Fig. 1, with the two front or uppermost scale members rotated into alinement such that the windows provided therein permit inspection of a scale provided on the rear or lowermost scale member, as hereinafter more particularly described;

Fig. 6 is a face view of another form of device according to this invention;

Fig. 7 is a sectional view on line 7—7 in Fig. 6;

Fig. 8 is a fragmentary section on line 8—8 in Fig. 6;

Figs. 9, 10, 11 and 12 are face views of four separate disc-shaped elements of the device shown in Fig. 6;

Fig. 13 is a face view of another form of device according to my invention;

Fig. 14 is a sectional view on line 14—14 in Fig. 13;

Fig. 15 is a fragmentary section on line 15—15 in Fig. 13; and

Figs. 16, 17, 18 and 19 are face views of four separate disc-shaped elements of the device shown in Fig. 13.

The form of device shown in Figs. 1 through 5 comprises four scale members indicated generally at A, B, C and D, interconnected for relative rotation about a common axis through the agency of a centrally located circular stud or bearing member 3 and a screw 4, and provided with scales that are concentrically disposed about said common axis, as described below.

The scale member A comprises a base 1 provided with a cylindrical recess 2 within which the other scale members are located, and a disc-shaped "film sensitivity" dial 5 fixedly mounted with respect to the base 1 and provided with a film sensitivity index or scale 6 having a plurality of angularly spaced indicia 6' in the form of printed numbers representing different values of film sensitivity according to any desired scale or system of measurement. The scale I have chosen to illustrate is based upon the "Film Exposure Index" and the "American Standard Speed Numbers," which are identical in value and are sponsored by the American Standards Association, rather than the more familiar "Weston Speed" or "G-E Speed" scales. As illustrated in Fig. 2, this scale runs from a speed of 0.25 to 4000, with the values increasing in a counter-clockwise direction, and may be extended in either direction as called for by the requirements of a given calculator, as will be apparent to one skilled in the art.

The dial 5 may be centered within the recess 2 through the agency of a ridge or land 7 extending peripherally about the disc 5 (this ridge being broken away where the base member is slotted to receive holding latches, as more particularly described hereinafter), and maintained against the base 1 by a shoulder 3a on the stud 3. The dial 5 may be fixed against rotation relative to base 1 by means of a detent 5' in the base 1, engaging a coacting notch in the rim of the dial.

The scale member B comprises a "light intensity" scale ring 8 located exteriorly of the ridge 7, and in the same plane as the disc 5. Ring 8 is provided with a light intensity scale 9 having a plurality of angularly spaced indicia 9' in the form of printed marks and associated numbers representing the different values of light intensity as indicated by the incident-light exposure meter with which the device is to be used. I preferably utilize a light scale 9 which is graduated in "foot-candles," and arrange the scale so that equal intervals indicate progressively increased light values. In this example, I have shown the light scale as based upon a factor of 2 geometric progression, with the values increasing in a clockwise direction. Thus, the interval between "2" and "4" foot-candles is the same as between "1" and "2" foot-candles, or between "32" and "64" foot-candles. This scale is shown as graduated between "1" and "128."

In order to provide an extended scale which will cover the light values which are encountered in general use, as from low light-level interior illumination to full exterior sunlight, I preferably make the scale movable to a plurality of positions such as to give a factor of 10 between different scale settings. For example, in the scale setting shown in Fig. 1, the indicia of scale 9 would represent light values in the range from 100 foot-candles to 12,800 foot-candles; if the scale were rotated counter-clockwise until the short line just clockwise from the scale number "8" (i. e., "10") is caused to occupy this position now occupied by the scale number "1," the scale indicia would represent a range of light values in the range from 10 foot-candles to 1280 foot-candles; similarly, if the scale 9 were rotated counter-clockwise until the position corresponding to "100" on the scale were located at the position now occupied by "1," the scale indicia would represent light values in the range from 1 foot-candle to 128 foot-candles.

For convenience in locating the ring 8 and the associated scale 9 at the several ranges, I provide a reference marker or arrow 11 on the ring 8 positioned to register with any one of a plurality of the indicia 12a, 12b and 12c of a "light intensity range" scale on the base 1 of scale member A. Said indicia are in the form of printed marks numbered "1," "2," and "3" successively in a counterclockwise direction, and are angularly spaced to correspond with the three angularly spaced range positions mentioned above. Thus, said indicia represent ranges of light intensity of different orders of magnitude, each differing from the next by a factor of 10. I also prefer to provide means for locking the ring 8 at any one of the selected range positions. Such locking means may comprise a spring latch member 13 located in a radially extending groove 14 in the base 1, said latch being secured centrally of the base 1 through the agency of the stud 3 and carrying a pin 15 adapted to extend through suitably spaced openings 16 in the ring 8. The latch 13 is provided with an upstanding portion 13a adapted to be engaged by the finger of the user and depressed to disengage the pin 15 from the hole 16, following which the ring 8 may be rotated by manual engagement of a projection 17 formed in the rim portion, preferably adjacent the arrow 11 (Fig. 1).

The scale member C comprises a "shutter speed" disc 18 superimposed upon the disc 5, the ridge 7 and the inner periphery of the ring 8, and provided with a scale shown generally at 19, indicative of shutter speed. Said scale has a plurality of angularly spaced indicia in the form of printed marks 19' and associated numbers representing different values of shutter speed, increasing in a counter-clockwise direction. The marks 19' are arranged in angular spacings correlated to the light intensity scale 9, according to common practice, and are positioned somewhat inward from the periphery of disc 18. The disc 18 is further provided with a reference marker in the form of an aperture 21 positioned so as to overlie the film sensitivity scale 6, the disc 18 being rotatable to expose any one of the plurality of film speed indicia or numerals 6'.

A spring latch member 22 (see Fig. 4), corresponding in function to the member 15 above, is provided to engage the disc 18 and maintain it in a desired setting, the latch being provided with a pin 23 adapted to engage in any one of a plurality of angularly spaced openings 24 provided in the disc 18, at intervals corresponding to the angular spacing between the film speed indicia 6'. The latch 22 is centrally secured to the base 1 by means of stud 3, as at 25, and is located in a radially extending groove 26 in the base to permit the pin to be sprung out of the associated hole 24 in the disc 18, and is provided with an upstanding portion 22a for manual engagement. The disc 18 may be provided with a peripheral tab 18a, preferably disposed diametrically opposite the window 21, to facilitate manual rotation.

The scale member D comprises a "lens aperture" or "f-stop" disc 27 superimposed upon the disc 18 and mounted on stud 3 for free rotation with respect to the base 1. Said disc 27 is provided with a lens aperture scale 28 correlated to the light-intensity scale 9 and having a plurality of angularly spaced indicia in the form of printed marks 28' and associated numbers representing different "f-stop" values, said numbers increasing in a counter-clockwise direction. Said indicia are arranged peripherally of disc 27 in position to register with the shutter speed indicia 19' on the disc 18. A window 29 is provided in the disc 27, through which the window 21 and the scale 6 may be observed upon rotating disc 27 to superimpose the windows 21 and 29 (see Fig. 5).

While I have described the device as provided with a lens aperture scale superimposed upon the shutter-speed scale, it will be appreciated that this relative position may be reversed, if desired. The principal reason for superimposing the lens aperture scale upon the shutter-speed scale in this embodiment of the invention is that useful lens apertures extend from only about f 1.0 to about f 64, which may conveniently be arranged in about three-quarters of the periphery of the disc 27 carrying such scale, while there is substantially no limit to the range of shutter timing which may be provided. Actually, I have shown shutter speeds from 1/1000 of a second up to 32 seconds, which requires substantially full utilization of the periphery of the shutter-speed disc 18.

The scale member D is also provided with a plurality of angularly spaced indices representing different values of "key light angle" and adapted to register with the indicia 9' of the light intensity scale 9. These key light angle indices are preferably located upon a radially extended portion 27a of the disc 27, within the one-quarter of the periphery of the disc 27 which is not utilized for lens aperture indicia, so as to overlie a portion of the shutter speed scale 19 and permit direct alinement of the key light angle indices with the light intensity indicia on the scale 9. The key light angle indices are so positioned as to be useful in setting the device for different effective angles of the "key" light which are to be considered in arriving at the proper photographic exposure. The effective illumination angle, as above-described, is the angle between the direction of the light-source (the sun, for example, when used exteriorly, or a strong artificial light, when used indoors) and the photographic axis, measured from the position of the subject. The subject of illumination resulting from the location of the light-source very close to the camera axis, i. e., with the sun right behind the camera, produces what is known as "front" lighting, and is the most effective photographically. This lighting may be considered as "0°" effective illumination angle. This "0°" effective illumination angle permits a minimum photographic exposure, and the key light angle index 31 is employed for setting the exposure calculating device for this condition. If the "key" light is directed upon the subject at an angle of 90° to the camera axis, the photographic exposure should be increased 100%, and for this reason the key light angle index 32 for use with the 90° angle is displaced from the index 31 in a clockwise direction an angular amount equal to the angular spacing of one photographic stop on the scale 28, (as, for example, the angular spacing between f 2.8 and f 4).

If the effective angle of illumination is about 45°, values midway between the values for "0°" and "90°" effective angle are required. The key light angle index 33 for the "45°" illumination angle is thus placed midway between the indices 31 and 32. Similarly, in case of "back" lighting illumination at an angle of 135° to the subject-camera axis requires double the exposure required for the 90° illumination, and the 135° key light angle index 34 is spaced clockwise from the index 32 by an angle equal to one full stop on the scale 28. It will be appreciated that if the effective angle of the illumination is not exactly at "0," "45" or "90" degrees, etc., the estimated angle may be employed by approximating the setting of the disc 27 at any intermediate value, by eye, within an accuracy of less than ¼ stop, which is adequate even for "natural" color films.

In Fig. 1, the disc 18 is shown as set for a film speed of "320." To make this adjustment, disc 27 is first rotated to superimpose aperture 29 over aperture 21 on disc 18. With latch means 22 and 23 disengaged, discs 18 and 27 are then rotated together to bring aperture 21 of disc 18 into register with the number "320" of the film sensitivity scale 6, and pin 23 is then engaged with the corresponding opening 24. This serves to latch the scale members C and A together, with the aperture 21 in the position shown in dotted lines in Fig. 1. As described above, the ring 8 is shown as set with the light intensity scale 9 in the "1" range position so that the indicia 9' thereof (numbered from 1 to 128) represent light intensity values in the range from 100 to 12,800 foot-candles, pin 15 engaging the corresponding opening 16 to latch scale members B and A together in the relative position shown in Fig. 1. This range position is indicated by alinement of the arrow 11 with the "1" range mark of the light intensity range scale on base 1.

It is assumed that the incident-light meter with which the device is used has given a reading of 300 foot-candles for the "key" light, and that the key light angle is 0°. The disc 27 (scale member D) is then set so as to indicate the proper photographic exposure for a film speed of 320, with these particular conditions of key light angle and light intensity. Thus, disc 27 is rotated to bring the 0° key light index mark 31 into alinement with the mark on light-intensity scale 9 representing 300 foot-candles (half-way between "2" and "4" on said scale), and the photographic exposure is then ascertained by reading the lens aperture value on scale 28 opposite any desired value of shutter speed on scale 19.

This setting is shown in Fig. 1, from which it will be seen that the desired photographic exposure is indicated as being:

(a) ¼₀₀ second at f 2.8, or,
(b) ½₀₀ second at f 4.0, or,
(c) ⅟₁₀₀ second at f 5.6, or,
(d) ⅟₅₀ second at f 8, or,
(e) ⅟₂₅ second at f 11, etc.

If the effective angle of illumination provided by the "key" light were 90°, the reference index 32 would be placed opposite the 300 foot-candle mark on the light intensity scale 9. The counterclockwise rotation of disc 27 to provide this alinement would result in the indication of the correct photographic exposure as being: ¼₀₀ second at f 2; ⅟₂₀₀ second at f 2.8; ⅟₁₀₀ second at f 4; ⅟₅₀ second at f 5.6, etc.

It will be obvious that the correlation between the angular spacings of the indicia of the several scales is such as to provide for similar modification of the indications of photographic exposure in accordance with variations in the key light angle, for any other conditions of light intensity and film sensitivity. For example, if the measured value of light intensity were twice as great as assumed above, the proper key light angle index would be set opposite "6" (halfway between "4" and "8") on the light intensity scale 9, and the indicated photographic exposure would in each case be one-half as great as in the first example; i. e., ⅟₄₀₀ second at f 4.0, etc., for a 0° key light angle, or ⅟₄₀₀ second at f 2.8, etc., for a 90° key light angle.

In addition to the proper correlation between the spacing of the indicia of the several scales, it will also be seen that the respective key light angle indices 31, 32, 33 and 34 are located on scale member D in such angular relationship to the indicia of the lens aperture scale 28 as to correctly modify the indications of related values of lens aperture and shutter speed in accordance with variations in the key light angle, when the corresponding key light angle index is set to register with any one of the indicia of the light intensity scale 9.

Various modifications may be made in the above-described form of device according to my invention. For example, as noted above, the lens aperture and shutter speed scales 28 and 19 may be interchanged in position, in which case these scales would also be reversed in their directions of increasing values. In such a modification, the key light angle indices would be provided on the same scale member as the shutter speed scale.

Another modification that may be made is to place the light intensity scale 9 on disc 18 (scale member C), and the shutter speed scale 19 on ring 8 (scale member B), with both of these scales reversed in the direction of increasing values. According to still another modification, the light intensity scale may be placed on the scale member D which is provided with the key light angle indices. For example, the light intensity scale 9 may be placed on disc 27 in place of the lens aperture scale 28, with values of light intensity increasing in a clockwise direction in the same manner as first described. In that case, the lens aperture scale 28 is preferably placed on disc 18 (scale member C), and the shutter speed scale 19 on ring 8 (scale member B), both of said scales being reversed in the direction of increasing values. In either of these last two described modifications, the scale members C and B are adjusted for the proper settings of film sensitivity and for the desired range of light intensity, and latched to scale member A, in the same manner as described above. The scale member D is then rotated to set the proper key light angle index (such as 31 for a 0° key light angle, etc.) opposite any desired shutter speed value on the scale 19 of ring 8 (scale member B). For any given reading of key light intensity as indicated by an incident-light meter, the proper value of lens aperture may then be read on scale 28 (on scale member D in the first of these two modifications, or on scale member C in the last described modification) opposite that light intensity value on scale 9 (on scale member C or D in the respective modifications).

Another possible modification is to place the light intensity scale 9 on scale member D, and the lens aperture scale 28 on ring 8 (scale member B), with both of these scales arranged in the directions of increasing values as shown in Figs.

1 and 2. In that case, the scale members B and C are adjusted and latched to scale member A, in the same manner as above. Scale member D may then be rotated to set the proper key light angle index thereon opposite any desired lens aperture value on the scale 28 of scale member B, and the corresponding shutter speed may be read on scale 19 of scale member C opposite the measured light intensity value on scale 9 of scale member D; or the scale member D may be set with the light value on scale 9 thereon opposite a selected shutter speed on scale 19 of scale member C, and the corresponding lens aperture may be read on scale 28 of scale member B opposite the proper key light angle index on scale member D.

Furthermore, it will be apparent that, in the form of device shown in Fig. 1–5 or in any of the above described modifications thereof, the indicia 12a, 12b and 12c representing the different ranges of light intensity values could alternatively be provided on ring 8 (scale member B) and the range reference mark, arrow 11, on the base 1 of scale member A, with equivalent results. In that case, with the other scales as shown, the indicia 12a, 12b and 12c representing the respective ranges "1," "2" and "3" (corresponding to light intensity values of 100, 10 and 1 times the light intensity scale readings of 1 to 128 foot-candles) would be arranged in the reverse angular relationship to that shown.

In some cases, one or more of the scales may be omitted. For example, it is not necessary in all cases that the light intensity scale be mounted for rotatable adjustment relative to the film sensitivity scale. Thus, the light intensity range scale could be omitted, and the light intensity scale could be provided on scale member A, as by rigidly securing ring 8 to base 1, in properly oriented position relative to the film sensitivity scale. In that case, the light intensity scale can be extended so as to include indicia representing light intensity values over the entire range of light intensities for which the device is to be used.

For use with motion-picture cameras in which the exposure time is fixed, the shutter speed scale on disc 18 (scale member C) may be condensed to a single arrow or other reference mark located at the angular position corresponding to the exposure time of the camera, whereby the proper lens aperture will be indicated on scale 28 opposite such reference mark, for any given setting of the several scale members.

In order to further illustrate the scope of the invention, and other modifications that can be made in the structure and interconnection of the scale members and in the relative arrangement of the several scales, I have shown two other specific embodiments of the invention.

The embodiment shown in Figs. 6 through 12 comprises three scale members indicated generally at E, F and G, interconnected for relative rotation about a common axis through the agency of a centrally located circular stud 41 and screw 42.

The scale member E is shown as comprising a "film sensitivity" disc 44 and a "shutter speed" disc 45 mounted in fixed positions on a base 43. For convenience of assembly in relation to the other scale members, the base 43, and discs 44 and 45 are formed as separate elements but are secured together against relative rotation by engagement of a pin 46 on stud 41 with a suitably located recess in 47 in base 43 and engagement of inwardly projecting tabs 44' and 45' on said discs with a suitably located slot 48 in said stud. Base 43 is provided with a cylindrical recess 49 within which discs 44 and 45 and the other scale members F and G are located.

Disc 44 is provided with a film sensitivity scale 51 (Fig. 12) having angularly spaced indicia 51' in the form of printed numbers representing different values of film sensitivity. Said scale is similar to the film sensitivity scale 6 described above, except that the film intensity values increase in a clockwise direction and are shown as covering a somewhat different range of film speeds, from 1 to 1000.

Disc 45 is of smaller diameter than disc 44 and is provided with a shutter speed scale 52 having angularly spaced indicia in the form of printed marks 52' and associated numbers representing different values of shutter speed, similar to the shutter speed scale 19 described above.

The scale member F comprises a "light intensity" disc 53 of the same diameter as disc 44 and mounted between discs 44 and 45 for rotation about stud 41. Said disc 53 is provided with a light intensity scale 54 having angularly spaced indicia 54' in the form of printed marks and associated numbers representing different values of light intensity. Scale 54 is similar to the light intensity scale 9 described above.

I provide, as before, for moving the light intensity scale 54 to a plurality of positions in which the graduations thereof represent light intensity values in ranges of different orders of magnitude. It will be seen that said scale occupies only about half of the periphery of disc 53, and I have provided within the remaining portion thereof a "light intensity range" scale comprising two angularly spaced indicia in the form of openings or "windows" 55a and 55b, representing ranges of light intensity differing from each other by a factor of 100. The openings 55a and 55b are located adjacent the periphery of disc 53, in position to permit viewing the indicia 51' of the film sensitivity scale therethrough (as is apparent in Fig. 6) so that either of said openings may be set to register with any value of film sensitivity. Opening 55a is marked "Range 1" and represents a range of light intensity values from 100 to 12,800 foot-candles. Opening 55b, which is spaced clockwise from opening 55a by an angle equal to the spacing between the indicia 12a and 12c in the form of device shown in Fig. 1, is marked "Range 2," and represents a light intensity range from 1 to 128 foot-candles. The relationship of the scale is such that if opening 55a is set to register with a given value of film sensitivity, the light intensity indicia 54' will represent light values from 100 to 12,800 foot-candles, while if opening 55b is set to register with that value of film sensitivity, the light intensity indicia 54' will represent light values from 1 to 128 foot-candles.

Disc 53 is also provided with a plurality of angularly spaced openings 57 positioned inwardly of the scales thereon, at intervals corresponding to the spacing of the film sensitivity indicia 51'. A spring latch member 58 (Figs. 6 and 8) is provided with a pin 59 passing through an opening 61 in disc 44 and adapted to engage in any one of the openings 57 to hold disc 53 in any desired position to which it is set, with either of the range scale openings 55a or 55b in register with any one of the film sensitivity indicia 51'. Latch member 58 is provided at its inner end with a hub portion 58' secured in position by stud 41. Said latch member is located in a radially extending groove 62 in base 43 and is provided with an upstanding portion 63 for manual engagement.

Disc 53 is also shown as provided with a peripheral tab 64 to facilitate manual rotative setting thereof relative to the base 43 and the relatively fixed discs 44 and 45 of scale member E.

Scale member G comprises a "lens aperture" disc 66 mounted above disc 45 for rotation about stud 41. Throughout the major portion of its periphery, said disc 66 is of less diameter than disc 45 and is provided with a lens aperture scale 67 having angularly spaced indicia 67' adapted to register with the shutter speed indicia 52' on said disc 45. The indicia 67' comprises printed marks or graduation and associated numbers representing different values of lens aperture of "f-stop," similar to the indicia of the above described scale 28.

The scale member G is also provided with a plurality of "key light angle" indices 68, 69, 70, and 71 representing angles of 0°, 45°, 90° and 135° respectively between the direction of the main or key illumination and the photographic axis. These indices correspond to the indices 31, 33, 32 and 34 respectively in Fig. 1, and are likewise located on a radially extended portion 66a of disc 66, in position to register with the light intensity indicia 54' on scale disc 53.

Scale member G is shown provided with a projecting tab 72 at each end of the portion 66a, for facilitating rotative adjustment thereof relative to the other scale members.

In using this form of device, the scale member F is rotated to bring the proper light intensity range "window" 55a or 55b into register with the desired film sensitivity value on scale 51 of scale member E, and is secured in this position by engaging the latch pin 59 with one of the openings 57. It will be seen that this one adjustment serves to place the light intensity scale 54 on scale member F in the properly selected position relative to the shutter speed scale 52 of scale member E, for the given values of both film sensitivity and light intensity range. Thus, the particular setting shown in Fig. 6 corresponds to a film speed of 10 (seen through openings 55a) for use with light intensity values in range "1" (in which case the graduations of light intensity scale 54 will represent values from 100 to 12,800 foot-candles), or to a film speed of 1,000 (seen through opening 55b) for use with light intensity values in range "2" (in which case the graduations of scale 54 will represent values from 1 to 128 foot-candles).

Scale member G may then be rotated so as to set the proper key light angle index 68, 69, 70 or 71 opposite the mark on light intensity scale 54 representing the measured value of light intensity, and the proper lens aperture may then be read on scale 67 of scale member G opposite any desired shutter speed value on scale 52.

The form of device shown in Figs. 13 through 19 comprises three scale members H, J and K, interconnected for relative rotation about a common axis by means of stud 76 and screw 77, and provided with concentric scales indicative of different exposure factors.

The scale member H comprises a "shutter speed" disc 78 and a "lens aperture" disc 79 fixed against relative rotation and secured to a base 81, by engagement of detents 82 on said discs and on base 81, with a slot 83 in stud 76, said base being again shown as recessed centrally to receive said discs and the scale members J and K.

Disc 78 is provided with a shutter speed scale 84 having angularly spaced indicia 84' and associated numbers representing different values of shutter speed, said scale being similar to the scales 19 and 52 described above, except that the shutter speed values increase in a clockwise direction.

Disc 79 is of considerably smaller diameter than disc 78 and is provided with a lens aperture scale 85 having angularly spaced indicia 85' representing different values of lens aperture or "f-stop," similar to scales 28 and 67 described above but also reversed as to direction of increasing "f-stop" numbers.

The scale members J and K comprise, respectively, a "film sensitivity" disc 88 and a "light intensity" disc 89 disposed between discs 78 and 79 and rotatable about stud 76. Disc 88 is of somewhat smaller diameter than disc 78, while disc 89 is smaller than disc 88 and larger than disc 79. Scale members J and K are provided with releasable interengaging latch means, such as described hereinafter, so that they may be either rotated independently or latched together for concurrent rotation relative to the discs of scale member H.

Disc 88 is provided with a film sensitive scale 91 having angularly spaced indicia 91' in the form of printed numbers representing different values of film sensitivity, similar to the scale 51 described above. The indicia 91' are disposed somewhat inward from the periphery of disc 88, on a position beneath the peripheral portion of disc 89, but are adapted to be viewed through one or more peripherally disposed openings in disc 89 as described hereinafter.

In this case, the angularly spaced "key light angle" indices 92, 93, 94 and 95, representing angles of 0°, 45°, 90° and 135° respectively between the direction of incidence of the key light on a photographic subject and the direction from the subject toward the camera, are located along the periphery of disc 88, in position to register with the shutter speed indicia 84' on disc 78. The indices 92, 93, 94 and 95 correspond in relative position and function to the indices 31, 33, 32 and 34 respectively in Fig. 1.

Disc 89 is provided with a light intensity scale 97 having angularly spaced indicia 97' in the form of printed marks and associated numbers representing different values of light intensity, said scale being similar to the scales 9 and 54 described above. The scale graduations are located adjacent the periphery of disc 79, in position to register with the graduations or indicia of the lens aperture scale 85 thereon.

Said disc 89 is also provided with a "light intensity range" scale comprising two angularly spaced indicia in the form of peripherally disposed openings or "windows" 98a and 98b, representing ranges of light intensity values differing from each other by a factor of 10. The openings 98a and 98b are so positioned as to permit the indicia 91' of the film sensitivity scale on disc 88 to be viewed therethrough, so that either of said openings may be set to register with any value of film sensitivity. Opening 98a is marked "1" and represents a range of light intensity values from 100 to 12,800 foot-candles. Opening 98b, which is marked "2," represents a light intensity range from 10 to 1280 foot-candles, and is spaced clockwise from opening 98a by an angle equal to the spacing between the indicia 12a and 12b in the device shown in Fig. 1. Thus, if opening 98a is set to register with a given value of film sensitivity, the light intensity indicia 97' will represent light values from 100 to 12,800 foot-candles, while if opening 98b is set to register with that value of film sensitivity the indicia 97' will represent light values from 10 to 1280 foot-candles.

The means for releasably latching the scale members J and K to one another for concurrent rotation is shown as comprising a small, preferably somewhat rounded, downwardly projecting detent 101 on disc 89 adapted to engage any one of a plurality of coacting recesses 102 on disc 88, said recesses being located at intervals corresponding to the angular spacing between the indicia 91' of the film sensitivity scale 91, there being one of said recesses in position to engage detent 101 when either of the openings 98a or 98b is set to register any one of said film sensitivity indicia. Disc 89 is sufficiently thin and resiliently flexible to enable detent 101 to pass into and out of engagement with successive recesses 102 upon manual rotation of said disc while disc 88 is held against rotation as by manual pressure thereon, thus permitting relative rotation of said discs to establish a given setting of light intensity range and film speed. However, if disc 88 is left free to rotate, the engagement of said detent with a given recess 102 is sufficient to cause discs 88 and 89 to rotate together upon manual rotation of the latter. Disc 89 may be provided with one or more projecting tabs 103 for facilitating manual rotation thereof, and one of said tabs is preferably located adjacent the detent 101 whereby it can also be used to press said detent into engagement with a recess 102 when the discs are to be rotated together, or to assist in releasing the detent from such engagement when it is desired to rotate disc 89 relative to disc 88.

In the preferred method of using this last-described form of calculating device, the scale member K is first rotated relative to scale member J, as described above, to bring the desired light intensity range "window" 98a or 98b into register with the proper film sensitivity value on scale 91. The setting of these scale members shown in Fig. 13 corresponds to a film speed of 10 (seen through opening 98a) for use with light intensity values in range "1" (in which case the graduations of light intensity scale 97 will represent values from 100 to 12,800 foot-candles), or to a film speed of 100 (seen through opening 98b) for use with light intensity values in range "2" (in which case the graduations of scale 97 will represent values from 10 to 1280 foot-candles). Scale members J and K may then be rotated together relative to scale member H, as described above, to bring the proper key light angle index 92, 93, 94 or 95 on scale member J into register with a suitable value of shutter speed on scale 84 of disc 78, and the proper lens aperture for that shutter speed may then be read on scale 85 of disc 79 opposite the measured value of light intensity on scale 97 of scale member K. Alternatively, scale members J and K may be rotated together to set the measured value of light intensity on 97 opposite a suitable value of lens aperture on scale 85, and the proper shutter speed may then be read on scale 84 opposite the appropriate key light angle index 92, 93, 94 or 95.

Various modifications may also be made in the forms of device shown in Figs. 6 through 12 and in Figs. 13 through 19. For example, the positions of certain of the scales may be interchanged, with due regard to the direction of increasing values thereof, or either of the scales indicative of light intensity range and shutter speed might be omitted and replaced by properly located reference marks, in manners comparable to the modifications described above in connection with Figs. 1 through 5.

I claim:

1. In a device for calculating photographic exposure, the combination comprising: a plurality of scale members interconnected for relative rotation about a common axis and provided with concentric scales indicative of a plurality of different exposure factors, including a scale indicative of intensity of the main or "key" illumination falling upon a photographic subject; each of said scales having a plurality of angularly spaced indicia representing different values of the corresponding exposure factor; said scale members being adapted to be set, by relative rotation, to indicate the proper value of one of said exposure factors corresponding to given values of the other exposure factors; one of said scale members being provided with one of said exposure factor scales and with a plurality of angularly spaced indices representing different angular relationships between the camera axis and the direction of said main or "key" illumination at the position of the photographic subject, said indices being positioned to register with the indicia of a scale on another of said scale members and being so located with respect to the indicia of said one scale as to modify the indications of said one exposure factor in accordance with variations in said angular relationship, when the corresponding one of said indices is set to register with any of the indicia of said other scale member.

2. In a device for calculating photographic exposure, the combination comprising: a plurality of scale members interconnected for relative rotation about a common axis and provided with concentric scales indicative of the factors lens aperture, shutter speed, film sensitivity, and light intensity; each of said scales having a plurality of angularly spaced indicia representing different values of the corresponding factor; said scale members being adapted to be set, by relative rotation, to indicate properly related values of lens aperture and shutter speed corresponding to given values of film sensitivity and light intensity; and one of said scale members being provided with one of said scales and with a plurality of angularly spaced indices representing different angular relationships between the camera axis and the direction of the main or "key" illumination falling upon a given photographic subject, said indices being positioned to register with the indicia of a scale on another of said scale members and being so located with respect to the indicia of said one scale as to modify the indications of related values of lens aperture and shutter speed in accordance with variations in said angular relationship, when the corresponding one of said indices is set to register with any of the indicia of said other scale member.

3. In a device for calculating photographic exposure, the combination comprising: a plurality of scale members interconnected for relative rotation about a common axis and provided with concentric scales indicative of the factors lens aperture, shutter speed, film sensitivity, light intensity, and different ranges of light intensity; each of said scales having a plurality of angularly spaced indicia representing different values of the corresponding factor; said scale members being adapted to be set, by relative rotation, to indicate properly related values of lens aperture and shutter speed corresponding to given values of the others of said factors, the indicia of the scale indicative of light intensity representing values of light intensity according to a geometric progression, and the indicia of the scale indicative of different ranges of light intensity representing ranges of different orders of magnitude; and one of said scale members being provided with one of said scales and with a plurality of angularly spaced indices representing different angular relationships between the camera axis and the direction of the main or "key" illumination falling upon a given photographic subject, said indices being positioned to register with the indicia of a scale on another of said scale members and being so located with respect to the indicia of said one scale as to modify the indications of related values of lens aperture and shutter speed in accordance with variations in said angular relationship, when the corresponding one of said indices is set to register with any of the indicia of said other scale member.

4. In a device for calculating photographic exposure, the combination comprising: scale means provided with a plurality of concentric scales indicative of the factors lens aperture, shutter speed, film sensitivity and light intensity, each of said scales having a plurality of angularly spaced indicia representing different values of the corresponding factor; said scale means including a scale member provided with one of said scales and rotatable relative to the other scales, said one scale member being adapted to be set, by such relative rotation, to indicate properly related values of lens aperture and shutter speed corresponding to given values of film sensitivity and light intensity and being provided with a plurality of angularly spaced indices representing different angular relationships between the camera axis and the direction of the main or "key" illumination falling upon a given photographic subject, said indices being positioned to register with the indicia of one of said other scales and being so located with respect to the indicia of said first-mentioned one scale as to modify the indication of related values of lens aperture and shutter speed in accordance with variation in said angular relationship, when the corresponding one of said indices is set to register with any of the indicia of said one of said other scales.

5. In a device for calculating photographic exposure, the combination comprising: a plurality of scale members interconnected for relative rotation about a common axis and provided with concentric scales indicative of the factor lens aperture and of other exposure factors including film sensitivity and light intensity; each of said scales having a plurality of angularly spaced indicia representing different values of the corresponding factor; said scale members being adapted to be set, by relative rotation, to indicate the required lens aperture value corresponding to given values of said other exposure factors; and one of said scale members being provided with one of said scales and with a plurality of angularly spaced indices representing different angular relationships between the camera axis and the direction of the main or "key" illumination falling upon a given photographic subject, said indices being positioned to register with the indicia of a scale on another of said scale members and being so located with respect to the indicia of said one scale as to modify the indications of lens aperture in accordance with variations in said angular relationship, when the corresponding one of said indices is set to register with any of the indicia of said other scale member.

6. In a device for calculating photographic exposure, the combination comprising: a plurality of scale members inter-connected for relative rotation about a common axis and provided with concentric scales indicative of the factor lens aperture and of other factors including film sensitivity, light intensity, and different ranges of light intensity; each of said scales having a plurality of angularly spaced indicia representing different values of the corresponding factor; said scale members being adapted to be set, by relative rotation, to indicate the required lens aperture values corresponding to given values of the others of said factors, the indicia of the scale indicative of light intensity representing values of light intensity according to a geometric progression, and the indicia of the scale indicative of different ranges of light intensity representing ranges of different orders of magnitude; and one of said scale members being provided with one of said scales and with a plurality of angularly spaced indices representing different angular relationships between the camera axis and the direction of the main or "key" illumination falling upon a given photographic subject, said indices being positioned to register with the indicia of a scale on another of said scale members and being so located with respect to the indicia of said one scale as to modify the indications of lens aperture in accordance with variations in said angular relationship, when the corresponding one of said indices is set to register with any of the indicia of said other scale member.

7. In a device for calculating photographic exposure, the combination comprising: scale means provided with a plurality of concentric scales indicative of the factor lens aperture and of other exposure factors including film sensitivity and light intensity, each of said scales having a plurality of angularly spaced indicia representing different values of the corresponding factor; said scale means including a scale member provided with one of said scales and rotatable relative to the other scales, said one scale member being adapted to be set, by such relative rotation, to indicate the required lens aperture corresponding to given values of said other exposure factors and being provided with a plurality of angularly spaced indices representing different angular relationships between the camera axis and the direction of the main or "key" illumination falling upon a given photographic subject, said indices being positioned to register with the indicia of one of said other scales and being so located with respect to the indicia of said first-mentioned one scale as to modify the indication of lens aperture in accordance with variations in said angular relationship, when the corresponding one of said indices is set to register with any of the indicia of said one of said other scales.

8. In a device for calculating photographic exposure, the combination comprising: a plurality of scale members interconnected for relative rotation about a common axis and provided with concentric scales including a pair of exposure factor scales indicative of lens aperture and shutter speed, a scale indicative of film sensitivity, and a scale indicative of light intensity; each of said scales having a plurality of angularly spaced indicia representing different values of the corresponding quantity; said scale members being adapted to be set, by relative rotation, to indicate on said exposure factor scales properly related values of lens aperture and shutter speed corresponding to given values of film sensitivity and light intensity; one of said scale members being rotatable relative to said light intensity scale and being provided with one of said pair of exposure factor scales and with a plurality of angularly spaced indices representing different angular relationships between the camera axis and the direction of the main or "key" illumination falling upon a given photographic subject, said indices being positioned to register with the indicia of said light intensity scale and being so located with respect to the indicia of said one exposure factor scale as to modify the indications of related values of lens aperture and shutter speed in accordance with variations in said angular relationship, when the corresponding one of said indices is set to register with any one of the indicia of said light intensity scale.

9. A device for calculating photographic exposure, which comprises: a base member; a generally circular light intensity scale member rotatably mounted on said base member; a plurality of other scale members rotatably mounted on said base member for concentric relative rotation with respect to one another and with respect to said light intensity scale member, said other scale members comprising a shutter speed scale member and a lens aperture scale member; said base member being provided with a film sensitivity scale concentric with said scale members; said plurality of other scale members being superimposed upon said film sensitivity scale and being each provided with window means opening upon said film sensitivity scale; and locking means adapted to engage one of said other scale members to position said one scale member against rotation with respect to said base member when the window of said one scale member is positioned over any one of a plurality of the scale markings on said film sensitivity scale.

10. A device for calculating photographic exposure, which comprises: a base member; a generally circular light intensity scale member mounted on said base member and rotatable with respect thereto, said scale member being provided with a plurality of angularly spaced indicia representing different values of light intensity based upon a geometric progression; locking means adapted to position said scale member in different positions such that the indicia thereon represent light values in different orders of magnitude; and a plurality of other scale members rotatably mounted on said base member for relative rotation with respect to one another and with respect to said light intensity scale member; said other scale members comprising a shutter speed scale member and a lens aperture scale member provided with concentrically arranged cooperative indicia respectively representing different values of shutter speed and different values of lens aperture; and one of said other scale members being provided with index means arranged in position for alinement with said indicia on said light intensity scale member.

11. A device for calculating photographic exposure, which comprises: a base member; a generally circular light intensity scale member mounted on said base member and provided with a light intensity scale; a plurality of other scale members rotatably mounted on said base member for concentric relative rotation with respect to one another and with respect to said light intensity scale member, said other scale members comprising a shutter speed scale member and a lens aperture scale member; and index means associated with one of said other scale members and with said light intensity scale, said index means having a plurality of angularly spaced indices separately identifying an index setting of the device for any one of a plurality of different angular relationships between the camera axis and the direction of the main or "key" illumination falling upon a given camera subject under a given lighting condition.

DONALD W. NORWOOD.

REFERENCES CITED

The following references are of record in the file of this patent:

UNITED STATES PATENTS

| Number | Name | Date |
|---|---|---|
| 456,869 | Watkins | July 28, 1891 |